United States Patent
Baker et al.

(10) Patent No.: US 7,079,858 B2
(45) Date of Patent: Jul. 18, 2006

(54) RADIO COMMUNICATION SYSTEM WITH ADJUSTABLE OUTPUT TRANSMISSION

(75) Inventors: Matthew P. J. Baker, Canterbury (GB); Timothy J. Moulsley, Caterham (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 805 days.

(21) Appl. No.: 09/814,386

(22) Filed: Mar. 21, 2001

(65) Prior Publication Data

US 2001/0036238 A1 Nov. 1, 2001

(30) Foreign Application Priority Data

Mar. 31, 2000 (GB) .................................. 0008020.0

(51) Int. Cl.
*H04Q 7/20* (2006.01)
*H04B 7/00* (2006.01)

(52) U.S. Cl. ..................... 455/522; 455/69; 370/342

(58) Field of Classification Search ................ 455/522, 455/68, 69, 13.4, 134–136, 442, 443; 370/317–321, 370/338, 332, 333, 335, 342

See application file for complete search history.

(56) References Cited

U.S. PATENT DOCUMENTS 5,056,109 A 10/1991 Gilhousen et al. ............. 375/1
6,343,218 B1 * 1/2002 Kaneda et al. .............. 455/522
6,556,838 B1 * 4/2003 Baker et al. ................ 455/522
6,611,690 B1 * 8/2003 Moulsley et al. ........... 455/522

FOREIGN PATENT DOCUMENTS

| DE | 19821519 A1 | 11/1999 |
| WO | WO 98/09384 | * 3/1998 |
| WO | WO9809384 | 3/1998 |
| WO | WO 00/04649 | * 1/2000 |
| WO | WO0004649 | 1/2000 |
| WO | WO0057572 | 9/2000 |
| WO | WO0074260 | 12/2000 |

* cited by examiner

Primary Examiner—Edan Orgad

(57) ABSTRACT

A radio communication system comprising a primary station and a plurality of secondary stations has a communication channel for the transmission of information from a secondary station to the primary station. The secondary station can adjust its output transmission power at a plurality of different rates, and the primary station can instruct the secondary station which of the plurality of rates it should use.

The primary station determines the optimum rate for the secondary station to use by measurement of characteristics of signals received from the secondary station, for example the average signal to interference ratio, and instructs the secondary station accordingly. Other indication may be used to determine or verify the optimum rate, for example further properties of the received signals or information on the speed of the secondary station.

12 Claims, 2 Drawing Sheets

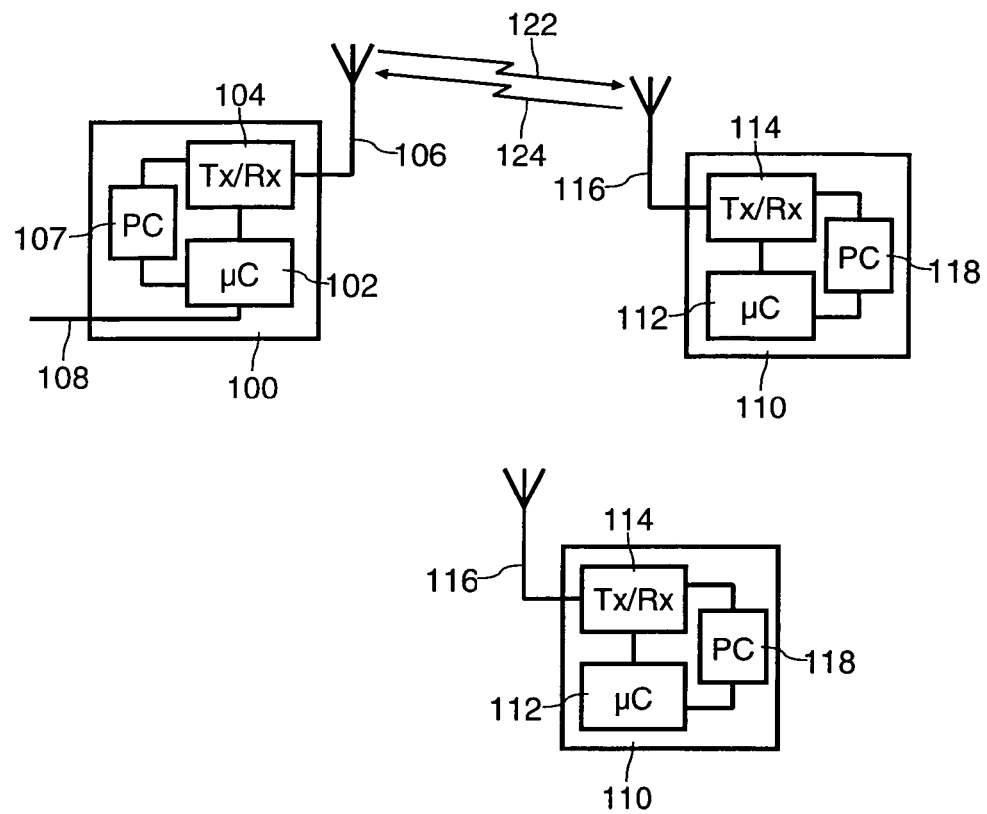
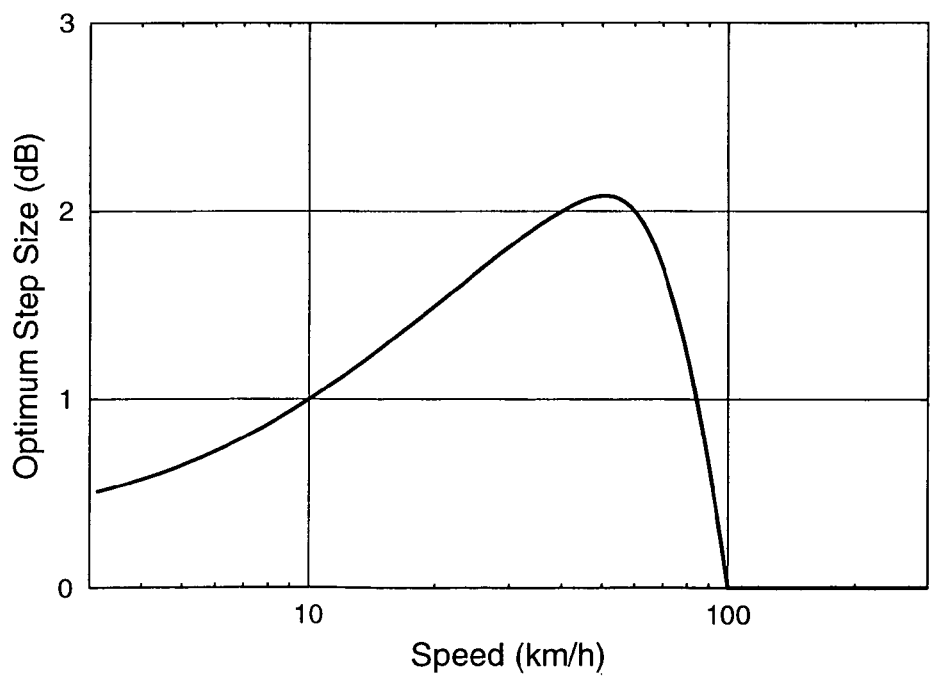

RADIO COMMUNICATION SYSTEM WITH ADJUSTABLE OUTPUT TRANSMISSION

BACKGROUND AND SUMMARY

The present invention relates to a radio communication system and further relates to a secondary station for use in such a system and to a method of operating such a system. While the present specification describes a system with particular reference to the emerging Universal Mobile Telecommunication System (UMTS), it is to be understood that such techniques are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many communication systems one of the functions of the control information is to enable power control. Power control of signals transmitted to the BS from a MS is required so that the BS receives signals from each different MS at approximately the same power level, while minimising the transmission power required by each MS. Power control of signals transmitted by the BS to a MS is required so that the MS receives signals from the BS with a low error rate while minimising transmission power, to reduce interference with other cells and radio systems. In a two-way radio communication system power control may be operated in a closed or open loop manner. In a closed loop system the MS determines the required changes in the power of transmissions from the BS and signals these changes to the BS, and vice versa. In an open loop system, which may be used in a TDD system, the MS measures the received signal from the BS and uses this measurement to determine the required changes in the transmission power.

An example of a combined time and frequency division multiple access system employing power control is the Global System for Mobile communication (GSM), where the transmission power of both BS and MS transmitters is controlled in steps of 2 dB. Similarly, implementation of power control in a system employing spread spectrum Code Division Multiple Access (CDMA) techniques is disclosed in U.S. Pat. No. 5,056,109.

In considering closed loop power control it can be shown that for any given channel condition there is an optimum power control step size which minimises the $E_b/N_0$ (energy per bit/noise density) required to obtain a particular bit error rate. When the channel changes very slowly the optimum step size can be less than 1 dB, since such values are sufficient to track changes in the channel while giving minimal tracking error. As the Doppler frequency increases (typically but not solely because of the motion of the MS), larger step sizes give better performance, with optimum values reaching more than 2 dB. However, as the Doppler frequency is further increased there comes a point where the latency (or update rate) of the power control loop becomes too great to track the channel properly and the optimum step size reduces again, perhaps to less than 0.5 dB. This is because the fast channel changes cannot be tracked so all that is needed is the ability to follow shadowing, which is typically a slow process.

Because the optimum power control step size can change dynamically it may improve performance if the BS instructs the MS which value of power control step size it should use in uplink transmissions to the BS. An example of a system which uses such a method is the UMTS Frequency Division Duplex (FDD) standard, where power control is important because of the use of CDMA techniques.

A problem in a communication system having variable power control step sizes is how to ensure that the step size remains set to its optimum value. Although the optimum step size for a particular MS speed is known, a MS does not generally know its own speed. Further, the speed of the MS itself is not in practice the only factor affecting the optimum power control step size.

An object of the present invention is to address the problem of dynamically selecting the optimum power control step size.

According to a first aspect of the present invention there is provided a radio communication system having a communication channel between a primary station and a secondary station for transmission of information from one of the primary and secondary stations (the transmitting station) to the other station (the receiving station), wherein the transmitting station has means for adjusting its output power at a plurality of different rates, the receiving station has means for determining, from measurements of characteristics of signals received from the transmitting station, an appropriate rate of adjustment of the output power of the transmitting station and means for communicating said rate of adjustment to the transmitting station, and the transmitting station has means responsive to communications from the receiving station for setting the adjustment rate of its output power.

Different rates of adjustment of output power can be achieved by altering the output power at predetermined intervals by steps of different sizes, or by altering the output power at varying intervals by steps of a predetermined size, or some combination of the two techniques. Small power control step sizes may be emulated, for example by only changing the output power when a certain number of identical power control commands have been received. The output power may also be varied continuously without steps.

According to a second aspect of the present invention there is provided a primary station for use in a radio communication system having a communication channel between the primary station and a secondary station, wherein means are provided for determining, from measurements of characteristics of signals received from the secondary station, an appropriate rate of adjustment of the output power of the secondary station, selected from one of a plurality of rates of adjustment available to the secondary station, and for communicating said rate of adjustment to the secondary station.

According to a third aspect of the present invention there is provided a secondary station for use in a radio communication system having a communication channel between the secondary station and a primary station, wherein means are provided for determining, from measurements of characteristics of signals received from the primary station, an appropriate rate of adjustment of the output power of the primary station, selected from one of a plurality of rates of adjustment available to the primary station, and for communicating said rate of adjustment to the primary station.

According to a fourth aspect of the present invention there is provided a method of operating a radio communication system having a communication channel between a primary station and a secondary station for transmission of information from one of the primary and secondary stations (the transmitting station) to the other station (the receiving station), the method comprising the receiving station determining, from measurements of characteristics of signals received from the transmitting station, an appropriate rate of adjustment of the output power of the transmitting station, selected from one of a plurality of rates of adjustment available to the transmitting station, and communicating the determined rate of adjustment to the transmitting station, and in response the transmitting station setting the adjustment rate of its output power.

The present invention is based upon the recognition, not present in the prior art, that the optimum power control step size can be determined from characteristics of received signals.

BRIEF DESCRIPTION OF THE DRAWINGS

Embodiments of the present invention will now be described, by way of example, with reference to the accompanying drawings, wherein.

FIG. 1 is a block schematic diagram of a radio communication system;

FIG. 2 is a graph of the optimum power control step size against the speed of a MS;

DETAILED DESCRIPTION

Figure 3:
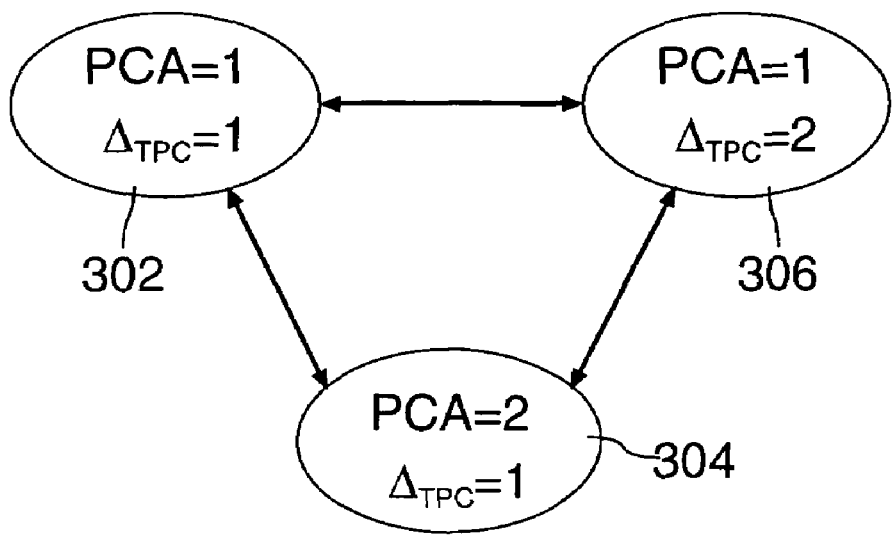
FIG. 3 is a diagram showing possible transitions between power control states in a UMTS system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to radio transmission means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to radio transmission means 116, and power control means (PC) 118 for altering the transmitted power level. Communication from BS 100 to MS 110 takes place on a downlink channel 122, while communication from MS 110 to BS 100 takes place on an uplink channel 124.

In a UMTS system as presently specified, the aim of the uplink power control is to maintain the Signal-to-Interference Ratio (SIR) of the signal received by the BS 100 at a given target level by instructing the MS 110 to is alter its transmission power. These instructions are conveyed by two-state Transmit Power Control (TPC) commands, transmitted once per time slot (there being 15 time slots per 10 ms frame). The size of steps is controlled by two parameters, PCA (Power Control Algorithm) and $\Delta_{TPC}$ (uplink Transmit Power Control step size), resulting in the availability of three effective power control step sizes.

When the value of PCA is 1, $\Delta_{TPC}$ can take a value of 1 or 2. If a received TPC command is "0" then the MS 110 reduces its transmission power by $\Delta_{TPC}$ dB, while if the received command is "1" the MS 110 increases its transmission power by $\Delta_{TPC}$ dB.

When the value of PCA is 2, $\Delta_{TPC}$ can only take the value of 1 and the MS 110 combines TPC commands in groups of five. If all five TPC commands are "1" the transmission power is increased by $\Delta_{TPC}$ dB, if all five TPC commands are "0" the transmission power is decreased by $\Delta_{TPC}$ dB, otherwise the transmission power is unchanged. This method effectively emulates the use of a power control step size of approximately 0.2 dB, as disclosed in UK patent application 9915571.5 (our reference PHB 34358).

FIG. 2 is a graph showing how the optimum power control step size varies with speed of the MS 110 over the range 3 to 300 km/h. The data for the graph was obtained from simulations to determine the step size required to minimise the value of Eb/N0 required for a bit error rate of 0.01. The simulations make a number of idealising assumptions:

there is a 1 slot delay in the power control loop;
there is no channel coding;
there is perfect channel estimation by the receiver;
equalisation in the receiver is carried out by a perfect RAKE receiver;
there is a fixed error rate in the transmission of power control commands;
the channel model is a typical multiple path Rayleigh UMTS channel (for example ITU pedestrian-A channel); and
all changes in the radio channel are due to movement of the MS 110.

The graph shows that at slow speeds, with a relatively slowly changing channel, best results are obtained with a small power control step size. As the speed of the MS increases the optimum step size also increases, as would be expected since the channel is changing more rapidly. However, for speeds above about 60 km/h the optimum step size reduces again. This is because the rate of change of the channel is higher than can be tracked given the update rate of the inner loop power control. In such circumstances optimum behaviour is obtained by ignoring rapid fluctuations and instead only tracking the relatively slow changes in average channel attenuation, due for example to shadowing, hence the use of small power control step sizes.

For the basic inner loop power control in a UMTS system, the BS 100 measures the value of the received SIR in every time slot (although measurements could be made more or less frequently). In one embodiment of a system made in accordance with the present invention, the measurements of the received SIR are used to calculate an average value of the magnitude of the rate of change of SIR, for example the rms value of d(SIR)/dt. This value is then used to determine the most appropriate settings for the PCA and $\Delta_{TPC}$ parameters.

Simulations have shown that the rms change of SIR per timeslot (when based on one SIR measurement per slot) is closely correlated to the fading rate of the channel, even in the presence of inner loop power control. Examples of suitable thresholds of rms change of SIR per timeslot for determining when suitable parameter settings are different from those currently user are as follows, determined from simulations of typical UMTS channels:

| d(SIR)/dt (dB/timeslot) | $\Delta_{TPC}$ | PCA |
|---|---|---|
| <1.2 | 1 | 1 or 2 |
| 1.2–2.6 | 2 | 1 |
| >2.6 | 1 | 2 |

The particular values of these thresholds will depend on which combination of PCA and $\Delta_{TPC}$ parameters is currently being used, since this will affect the expected rate of change of SIR. The threshold values in the table above relate to the case where PCA and $\Delta_{TPC}$ are both set to 1.

Further simulations determined that the rms averaging process needs to be carried out over a significant number of frames, with averaging over for example 30 frames (i.e. 0.3 seconds) giving good results. Depending on the determined value of rms change in SIR per timeslot transitions between any of the three possible combinations of PCA and $\Delta_{TPC}$ parameters can be made, as illustrated in FIG. 3. For example, the initial settings may be those of state 302, with PCA set to 1 and $\Delta_{TPC}$ to 1. The BS 100 may then determine that the rate of change of SIR is very large, and hence instruct the MS 110 to change to state 304, with PCA set to 2 and $\Delta_{TPC}$ to 1. A new set of thresholds will then apply. After some time, the MS 110 slows down and the rate of change of SIR decreases below the highest threshold, so the BS 100 instructs the MS 110 to change to state 306, with PCA set to 1 and $\Delta_{TPC}$ to 2.

Figure 4:
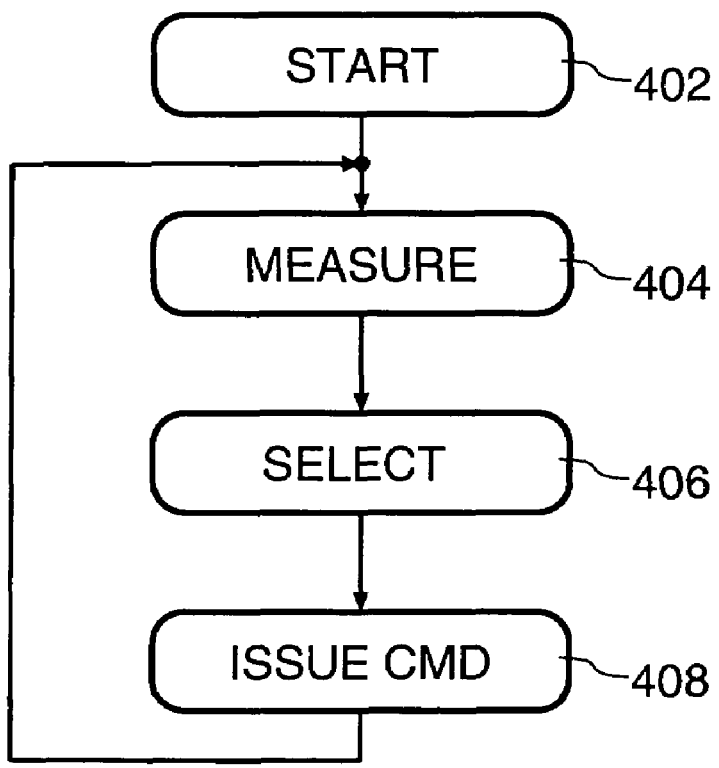
FIG. 4 is a flow chart illustrating a method in accordance with the present invention for adjusting power control parameters.

This process is summarised in the flow chart of FIG. 4. The process begins, at step 402, after which the BS 100 measures the received SIR and calculates its rms rate of change, at step 404. The BS 100 then, at step 406, determines, based on the rate of change of SIR, appropriate settings for the PCA and $\Delta_{TPC}$ parameters, which settings are communicated to the MS 110, at step 408, as one or more commands instructing it to change its settings. The process then loops back to the measurement at step 404, and continues to loop while the connection between BS 100 and MS 110 remains active.

The process described above can be improved in a number of ways. A time delay can usefully be introduced between BS 100 determining that the threshold rate of change of SIR has been crossed and the MS 110 being instructed to change its power control parameters. This avoids frequent oscillation across the thresholds with the resultant need for an undesirably high level of signalling.

As well as the rate of change of received SIR, other properties of the received signal could be used to verify the decision to change power control parameters. Such properties could for example include the variance of the SIR of the received uplink signal.

Although setting power control parameters depending on the speed of the MS 110 is not generally appropriate, if knowledge of its speed is available this may be used in conjunction with SIR measurements to set the power control parameters. In some circumstances, it may even be appropriate to set the parameters depending on speed alone. Simulations similar to those performed to determine the optimum power control step size for FIG. 2 were performed to determine appropriate settings for a MS 110 moving at various speeds. The results showed that suitable settings are:

| Speed (km/h) | $\Delta_{TPC}$ | PCA |
|---|---|---|
| <2 | 1 | 2 |
| 2–30 | 1 | 1 |
| 30–80 | 2 | 1 |
| >80 | 1 | 2 |

Such information could be used to distinguish between very slowly-changing channels, where setting PCA to 2 is beneficial, and slightly less slowly-changing channels, where setting PCA and $\Delta_{TPC}$ to 1 is beneficial. Hence, in cases where the rms change of SIR per timeslot is less than 1.2 dB, the BS 100 could check the location measurements to determine whether better performance could be obtained by switching PCA from 1 to 2.

The description above related to the BS 100 determining appropriate settings for the PCA and $\Delta_{TPC}$ parameters. In practice the setting of parameter values may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure responsible for the determining and setting of PCA and $\Delta_{TPC}$ parameter values.

The detailed description above relates to a system where the BS 100 transmits power control commands separately from instructions to the MS 110 to set its power control step size. However, the present invention is suited for use in a range of other systems. In particular, it can be used in any system in which there is a variable power control step size and in which the BS 100 instructs the MS 110 to use a particular value for this step. Instead of the BS 100 instructing the MS 110 to use a particular step size, that to be used could also be determined by negotiation between the BS 100 and MS 110.

Further, although the description above relates to power control by a BS 100 of the uplink channel 124, such a method could equally well be employed for power control by a MS 110 of the downlink channel 122.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising: a communication channel between a primary station and a secondary station for transmission of information from one of the primary and secondary stations (the transmitting station) to the other station (the receiving station), wherein the transmitting station is adapted to adjust its output power at a plurality of different rates, and the receiving station is adapted to determine, from measurements of a time rate of change of received signal to interference ratio averaged over a predetermined period received from the transmitting station, an optimum rate of adjustment of the output power of the transmitting station and is adapted to communicate said optimum rate of adjustment to the transmitting station, and the transmitting station is adapted to set the adjustment rate in response to communications from the receiving station for setting the adjustment rate of its output power.

2. A primary station as claimed in claim 1, wherein further properties of the received signal are used to verify the rate of change of output power determined from the rate of change of received signal to interference ratio.

3. A primary station for use in a radio communication system, comprising: a communication channel between the primary station and a secondary station, wherein the primary station is adapted to determine, from measurements of a time rate of change of received signal to interference ratio received from the secondary station, an optimum rate of adjustment of the output power of the secondary station, selected from one of a plurality of rates of adjustment available to the secondary station, and for communicating said rate of adjustment to the secondary station.

4. A primary station as claimed in claim 3, wherein the time rate of change of received signal to interference ratio is averaged over a predetermined period of time.

5. A primary station as claimed in claim 3, wherein communication to the secondary station of required changes in its rate of adjustment of output power is made after the measured signal characteristic has passed a threshold for a predetermined period.

6. A primary station as claimed in claim 3, wherein means are provided for determining the speed of the secondary station and for adjusting the determined appropriate rate of adjustment of the output power of the secondary station depending in the speed of the secondary station.

7. A secondary station for use in a radio communication system, comprising:
a communication channel between the secondary station and a primary station, wherein the secondary station is adapted to determine, based on measurements of a time rate of change of received signal to interference ratio, an optimum rate of adjustment of the output power of the primary station, selected from one of a plurality of rates of adjustment available to the primary station, and for communicating said rate of adjustment to the primary station.

8. A secondary station as claimed in claim 7, wherein the time rate of change of the received signal to interference ratio is averaged over a predetermined period.

9. A secondary station as claimed in claim 8, wherein further properties of the received signal are used to verify the rate of change of output power determined from the rate of change of received signal to interference ratio.

10. A secondary station as claimed in claim 7, wherein communication to the primary station of required changes in its rate of adjustment of output power is made after the measured signal characteristic has passed a threshold for a predetermined period.

11. A method of operating a radio communication system, comprising:
providing a communication channel between a primary station and a secondary station for transmission of information from one of the primary and secondary stations (the transmitting station) to the other station (the receiving station); determining at the receiving station, from measurements of a time rate of change of received signal to interference ratio, an optimum rate of adjustment of the output power of the transmitting station, selected from one of a plurality of rates of adjustment available to the transmitting station; and communicating the determined rate of adjustment to the transmitting station, and in response the transmitting station, setting the adjustment rate of its output power.

12. A method as claimed in claim 11, wherein the time rate of change of received signal to interference ratio is averaged over a predetermined period of time.

* * * * *